Patented Oct. 1, 1940

2,216,257

UNITED STATES PATENT OFFICE 2,216,257

PROCESS OF BREAKING MINERAL OIL EMULSIONS

Eberhard Vogt and Karl Smeykal, Leuna, Germany, assignors, by mesne assignments, to William E. Currie, New York, N. Y.

No Drawing. Application May 25, 1938, Serial No. 209,989. In Germany May 29, 1937

3 Claims. (Cl. 252—332)

The present process relates to a process for breaking emulsions particularly those of mineral oils.

Mineral oils which occur naturally are frequently obtained in the form of more or less stable water-in-oil emulsions which must be destroyed in order to recover the mineral oils. The breaking of the said emulsions frequently offers considerable difficulty and in many cases, even when using chemical assistants, it is impossible to effect a rapid and smooth breaking of the emulsions.

We have now found that mineral oil emulsions can be rapidly and completely destroyed by adding to the emulsions sulphonation products of high molecular weight olefines or their salts. Sulphonation products of olefines containing from about 10 to about 20 carbon atoms in the molecule are especially suitable.

As initial materials for the preparation of the said sulphonation products there may be used olefines from various sources, as for example those obtainable by cracking or hydrogenation of carbonaceous materials, as for example coals, tars and the like, by distillation and separation of the suitable fractions from the crude cracking or hydrogenation products. There may also be used sulphonation products of high molecular weight olefines obtained by polymerization of low molecular weight olefines. Sulphonation products of olefines which have been obtained by splitting off water from the oxygen-containing hydrogenation products of oxides of carbon, boiling above 100° C., in particular by leading carbon monoxide and hydrogen under elevated pressure over catalysts containing zinc oxide, are particularly suitable.

The preparation of the sulphonation products is effected by known methods, but it may be carried out in a special way, as for example according to the U. S. Patents 1,931,491 and 2,037,229. According to the working conditions employed in the sulphonation acid sulphuric acid esters or true sulphuric acids or mixtures of both can be obtained.

The said sulphonation products or their water-soluble salts, as for example alkali, ammonium or amine salts, or mixtures of both are added in the solid, dissolved or suspended form to the mineral oil emulsions, and if desired their distribution in the emulsions may be favored by the use of nozzles, stirring means or the like. As solvents for the said sulphonation products there may be mentioned in particular water, organic solvents or mineral oils, the latter advantageously in an anhydrous state.

It is preferable to select as solvent the same mineral oil as is present in the emulsion to be split up because in this way a specially smooth and rapid distribution of the splitting agent is effected. The use of mineral oils as solvents for the sulphonation products offers no difficulty because the sulphonates are generally speaking soluble in the mineral oil to a great extent or completely.

The amount of sulphonation products to be used depends on the nature of the emulsions and on the activity of the sulphonation product; the amount may readily be determined by a preliminary experiment. Generally speaking it is sufficient to add from 100 to 200 grams of the said sulphonation products per cubic meter of a mineral oil emulsion in order to obtain a splitting up of the emulsion which is sufficiently rapid and smooth in practice.

It has already been proposed to use surface-active substances for the separation of water-in-oil emulsions, as for example alkali salts of higher fatty acids, naphthenic acids and their salts, and certain sulphonation products of mineral oils, fats, carboxylic acids and alcohols. The sulphonation products of high molecular weight olefines offer considerable advantages over the said products because they render possible a specially smooth and rapid separation of mineral oil emulsions. The said sulphonation products of high moecular weight olefines may also be employed for breaking aqueous emulsions of other substances than mineral oils, for example aqueous emulsions of vegetable or animal oils, fats or waxes.

The following example will further illustrate the nature of this invention but the invention is not restricted to this example.

Example

An aqueous emulsion of Rumanian petroleum having a content of 7.4 per cent of water and 0.9 per cent of common salt (i. e., about 120 grams of common salt per litre of water) has added to it, while stirring, 200 grams of a sulphonation product of a mixture of di-isohexylene and di-isoheptylene per cubic meter. There is thus obtained, even after 3 hours, a complete separation of the emulsion into oil and water. By using 500 grams of the said sulphonation product per cubic meter of the same petroleum emulsion, a separation of the emulsion into oil and water takes place even after 10 minutes.

The sulphonation product used for the splitting was prepared by sulphonation of a mixture of di-isohexylene and di-isoheptylene (obtainable by treating isohexylene and isoheptylene with 85 per cent sulphuric acid) with a mixture of acetic anhydride and 100 per cent sulphuric acid and working up in the usual manner. The mixture of isohexylene and isoheptylene serving as initial material is obtained by dehydration of the fraction boiling between 145° and 165° C. of hydrogenation products of carbon monoxide.

What we claim is:

1. The process for breaking aqueous emulsions which comprises adding to the emulsions a sulphonation product of a polymerized mixture of olefines obtained by dehydrating high molecular alcohols from the hydrogenation of carbon oxides, the polymerized mixture containing olefins with from 10 to about 20 carbon atoms in the molecule.

2. The process for breaking aqueous emulsions which comprises adding to the emulsions a sulphonation product of a polymerized mixture of olefines obtained from the dehydrogenation products of oxygen containing substances boiling between 145° and 165° C. of the hydrogenation products of carbon oxides.

3. The process for breaking aqueous emulsions which comprises adding to the emulsions a sulphonation product of a mixture of di-isohexylene and di-isoheptylene.

EBERHARD VOGT.
KARL SMEYKAL.